(12) United States Patent  
Soliman (10) Patent No.: US 9,191,783 B2  
(45) Date of Patent: Nov. 17, 2015

(54) DRIVER DISTRACTION DETECTION AND REPORTING

(71) Applicant: QUALCOMM Incorporated, San Diego, CA (US)

(72) Inventor: Samir Salib Soliman, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 13/801,414

(22) Filed: Mar. 13, 2013

(65) Prior Publication Data

US 2014/0273868 A1 Sep. 18, 2014

(51) Int. Cl.  
*H04W 4/04* (2009.01)  
*H04W 4/20* (2009.01)

(52) U.S. Cl.  
CPC ............... *H04W 4/046* (2013.01); *H04W 4/20* (2013.01)

(58) Field of Classification Search  
CPC ................................ H04W 4/046; H04W 4/20  
USPC ....................................................... 455/67.11  
See application file for complete search history.

(56) References Cited

U.S. PATENT DOCUMENTS

| | | | |
|---|---|---|---|
| 8,384,555 B2 | 2/2013 | Rosen | |
| 2009/0029675 A1* | 1/2009 | Steinmetz et al. | 455/410 |
| 2011/0136509 A1* | 6/2011 | Osann, Jr. | 455/456.3 |
| 2011/0171943 A1* | 7/2011 | Raviv | 455/418 |
| 2011/0237219 A1 | 9/2011 | Mendenhall et al. | |
| 2011/0244890 A1 | 10/2011 | Lehmann et al. | |
| 2012/0088462 A1 | 4/2012 | Mader et al. | |
| 2012/0282906 A1 | 11/2012 | Frye et al. | |
| 2014/0256303 A1* | 9/2014 | Jones | 455/418 |

FOREIGN PATENT DOCUMENTS

WO 2009014703 A1 1/2009

OTHER PUBLICATIONS

International Search Report and Written Opinion from International Application No. PCT/US2014/020328, dated Sep. 25, 2014, 10 pp.

* cited by examiner

*Primary Examiner* — David Bilodeau  
(74) *Attorney, Agent, or Firm* — Shumaker & Sieffert, P.A.

(57) ABSTRACT

A system including a communication detection and classification apparatus configured to detect and classify radio signals is disclosed. The system may include a communication service detection unit configured to detect available radio communication services and to store system parameters relating to the available radio communication services in a memory, an access probe and energy detection unit configured to detect a radio signal within a proximity to the communication detection and classification apparatus and to store the detected radio signal, wherein the radio signal is communicated over one of the detected available radio communication services, an analysis unit configured to analyze the detected radio signal, and a classification unit configured to classify a type of activity of the detected radio signal based on an output of the analysis unit.

37 Claims, 8 Drawing Sheets

DRIVER DISTRACTION DETECTION AND REPORTING

TECHNICAL FIELD

This disclosure relates to the detection and classification of radio signals.

BACKGROUND

Use of mobile phones and other network connected devices while driving has been identified as a major factor in traffic accidents. Because of this, companies that employ drivers have a strong interest in limiting mobile phone use to protect their employees and assets. Current attempts to block mobile phone use while driving often involve the issuance of a company-owned phone. Such phones typically include software that disables communication abilities (e.g., text, internet browsing services, phone calls without a headset) when vehicle movement is detected. However, such measures are easily defeated if the driver uses a personal phone that does not include such blocking software.

SUMMARY

In general, this disclosure describes techniques for the detection and classification of radio signals. In various examples, this disclosure provides a method and apparatus for detecting radio communications originating from an operator of a vehicle, and classifying a type of activity of the radio communication. In this way, information can be obtained relating to activity that may be potentially distracting the driver (e.g., making phone calls, sending text messages, etc.).

In one example of the disclosure, a system including a communication detection and classification apparatus configured to detect and classify radio signals is disclosed. The system may include an access probe and energy detection unit configured to detect a radio signal within a proximity to the communication detection and classification apparatus and to store the detected radio signal, an analysis unit configured to analyze the detected radio signal, and a classification unit configured to classify a type of activity of the detected radio signal based on an output of the analysis unit. In one example, the system may further include a communication service detection unit configured to detect available radio communication services and to store system parameters relating to the available radio communication services in a memory, wherein the detected radio signal is communicated over one of the detected available radio communication services.

In another example, a method of detecting and classifying radio signals using a communication detection and classification apparatus comprises detecting available radio communication services, storing system parameters relating to the available radio communication services in a memory, detecting a radio signal within a proximity to the communication detection and classification apparatus, wherein the radio signal is communicated over one of the detected available radio communication services, storing the detected radio signal, analyzing the detected radio signal, and classifying a type of activity of the detected radio signal based on the analysis.

In another example, a system is configured to detect and classify radio signals using a communication detection and classification apparatus. The system comprises means for detecting available radio communication services, means for storing system parameters relating to the available radio communication services in a memory, means for detecting a radio signal within a proximity to the communication detection and classification apparatus, wherein the radio signal is communicated over one of the detected available radio communication services, means for storing the detected radio signal, means for analyzing the detected radio signal, and means for classifying a type of activity of the detected radio signal based on the analysis.

In another example, this disclosure describes a computer-readable storage medium storing instructions that, when executed, cause one or more processors to detect available radio communication services, store system parameters relating to the available radio communication services in a memory, detect a radio signal within a proximity to the communication detection and classification apparatus, wherein the radio signal is communicated over one of the detected available radio communication services, store the detected radio signal, analyze the detected radio signal, and classify a type of activity of the detected radio signal based on the analysis.

The details of one or more examples are set forth in the accompanying drawings and the description below. Other features, objects, and advantages will be apparent from the description and drawings, and from the claims.

DETAILED DESCRIPTION

Use of mobile phones and other network connected devices while driving has been identified as a major factor in traffic accidents. Because of this, companies that employ drivers have a strong interest in limiting mobile phone use to protect their employees and assets. Current attempts to block mobile phone use while driving often involve the issuance of a company-owned phone. Such phones typically include software that disables communication abilities (e.g., text, internet browsing services, phone calls without a headset) when vehicle movement is detected. However, such measures are easily defeated if the driver uses a personal phone that does not include such blocking software.

In view of these drawbacks, this disclosure presents an apparatus and technique for monitoring and classifying the use of radio communication devices (e.g., mobile phones, laptops, tablet computers) that does not require the cooperation of the radio communication device. That is, the techniques of this disclosure do not require any direct interaction with a radio communication device (e.g., monitoring software operating on a mobile phone) and need not be able to decrypt or ascertain any specific message content sent by the radio communication device. In various examples, this disclosure proposes a communication detection and classification device that can detect a radio signal within a proximity of the device, analyze the detected signal, and classify the type of communication (e.g., voice call, text message, internet browsing, background communication, etc.). The communication detection and classification device may be placed within and/or integrated with a vehicle. In some examples of the disclosure, the communication and detection classification device is enabled when the vehicle is moving.

Once a radio communication has been classified using the techniques of this disclosure, the communication detection and classification device may store a log of any detected and classified communications, or may send a message alerting of a detected and classified communication. In this way, the owner of the vehicle may be alerted to any use of radio communication devices while the vehicle is moving. Various example systems, devices, methods, and techniques of this disclosure will be described in more detail with reference to the figures below.

Figure 1:
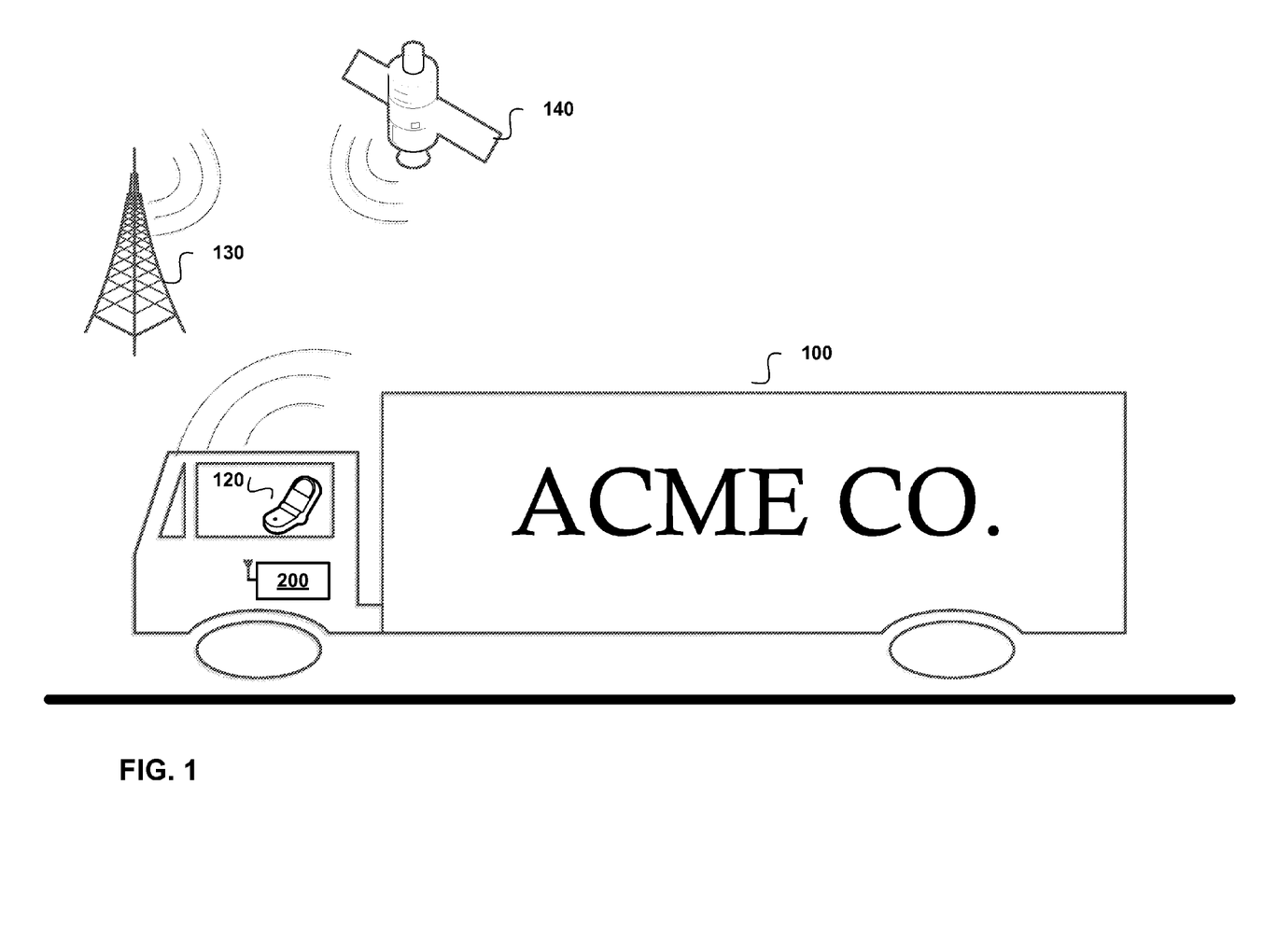
FIG. 1 is a conceptual diagram showing an example operating environment for example systems, devices, and method of this disclosure.

FIG. 1 is a conceptual diagram showing an example operating environment for example systems, devices, and method of this disclosure. One example operating environment for the systems and techniques of this disclosure is for use within trucks and other delivery vehicles. For example, detection and classification unit 200 may be placed within truck 100 for the detection and classification of radio signals emanating from a driver of the truck.

The techniques of this disclosure are not, however, limited for use in the trucking or delivery vehicles business. Detection and classification unit 200 may be used to detect unwanted or unauthorized use of radio communication devices in any environment. For example, detection and classification unit 200 may be used in any environment where a distracted driver, operator and/or user are undesirable. For example, detection and classification unit 200 may be used in passenger vehicles, cars, vans, boats, heavy machinery (cranes, forklifts, dump trucks, backhoes, or other machinery), trains, airplanes, all-terrain vehicles (ATVs), snowmobiles, helicopters, air traffic control towers, factory floors, or in any vehicle or environment where distraction detection and prevention is desirable.

In the example of FIG. 1, detection and classification unit 200 is used to detect and classify a radio communication emanating from communication device 120 from within truck 100. Communication device 120 may be any type of device capable communicating over any type of air interface, including both land based networks 130 and satellite networks 140. Example air interfaces and technologies may include analog cellular networks, Global System for Mobile Communication (GSM) cellular networks, code division multiple access (CDMA) cellular networks, wideband CDMA (W-CDMA) cellular networks, $3^{rd}$ generation (3G) cellular networks, fourth generation (4G) cellular networks, long term evolution (LTE) cellular networks, satellite communication technologies (e.g., Iridium, Inmarsat, etc.), push-to-talk networks (e.g., Q-chat by Qualcomm, Inc.), ham radio, or any other type of radio network.

As shown in FIG. 1, communication device 120 is a mobile phone. Other example communication devices may include voice-only phones, so-called "smart" phones, tablet computers, laptop computers, netbook computers, push-to-talk phones, short-wave radios, or any other type of device capable of communication through a radio signal. Such communications may include voice calls, text messages, voice-over-internet protocol (VOIP) signals, general IP communications (e.g., internet browsing), background and control communication with a network, etc.

Detection and classification unit 200 may be placed anywhere in truck 100 such that a detected signal from communication device 120 may be determined to have come from within the truck (as opposed to detected radio signals emanating from somewhere other than within the truck, e.g., another nearby vehicle). Preferably, detection and classification unit 200 is mounted in the truck as near the driver as possible. Detection and classification unit 200 may include its own power source and require no integration with truck 100. In other examples, detection and classification unit 200 may be integrated with truck 100. In one example, detection and classification unit 200 may be powered through the power system of truck 100. In another example, detection and classification unit 200 may be further integrated with truck 100 to use other vehicle subsystems (e.g., a position/location and/or global positioning system (GPS)).

Figure 2:
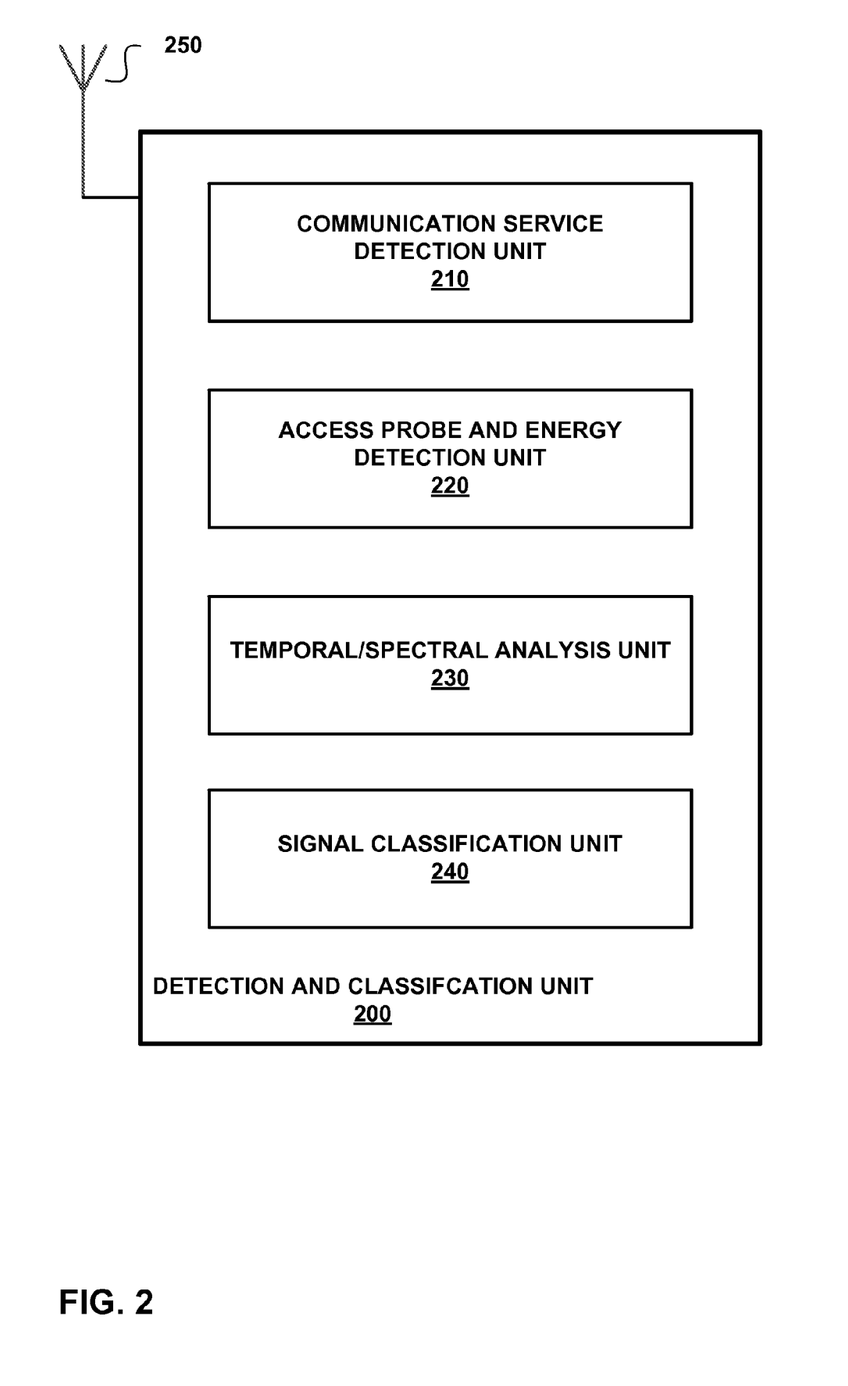
FIG. 2 is a block diagram illustrating an example detection and classification unit according to one example of the disclosure.

FIG. 2 is a block diagram illustrating an example detection and classification unit 200 according to one example of the disclosure. In the example of FIG. 2, detection and classification unit 200 includes communication service detection unit 210, access probe and energy detection unit 220, temporal/spectral analysis unit 230, signal classification unit 240, and antenna 250.

In one general example, communication service detection unit 210 is configured to detect available radio communication services and to store system parameters relating to the available radio communication services in a memory. Access probe and energy detection unit 220 is configured to detect a radio signal within a proximity to the detection and classification apparatus 200 and to store the detected radio signal, wherein the radio signal is communicated over one of the detected available radio communication services. Temporal/spectral analysis unit 230 configured to analyze the detected radio signal using one or more of temporal and spectral analysis techniques. Signal classification unit 240 is configured to classify a type of activity (e.g., voice call, text message, internet browsing, etc.) of the detected radio signal based on an output of analysis unit 230. Antenna 250 may be utilized by communication service detection unit 210 to receive signals from available radio communication services. Antenna 250 may also be used by access probe and energy detection unit 250 to receive radio signals near the detection and classification unit 200. The sub-units of detection and classification unit 200 will be discussed in more detail below. In one example, communication service detection unit 210 and access probe and energy detection 220 may be combined in a single "energy detection unit" configured to both scan and detect radio signals from communication device 120.

As mentioned above, communication service detection unit 210 is generally configured to detect available radio communication services and to store system parameters relating to the available radio communication services in a memory. In an example of the disclosure, communication service detection unit 210 may include a receiver that is configured to detect and receive system parameters in analog cellular networks, GSM cellular networks, CDMA cellular networks, W-CDMA cellular networks, 3G cellular networks, 4G cellular networks, LTE cellular networks, satellite communication networks, push-to-talk networks, ham radio, or any other type of radio network. In a specific example, communication service detection unit 210 may be a multi-mode receiver module, such as those used in current generation mobile phones. Such multi-mode receivers may be configured to communicate over any available consumer cellular network within a given area (e.g., North America, Europe, etc.).

The system parameters that are detected by communication service detection unit 210 may include frequency band, frequency channel, air interface protocol (e.g., CDMA, GSM, 3G, 4G, LTE, etc.) When detecting cellular networks, communication service detection unit 210 may also detect parameters related to the random access channel (RACH), mobility management, and other system information blocks (SIB) for particular networks. Some or all of the above parameters may be stored in a memory for future use.

The next section will explore a RACH in a cellular network in more detail. A RACH is common uplink channel for a cellular network that may be use to send data transmission request (e.g., a call request) or other short packets of data. RACH parameters are broadcast by base stations and include information that informs a mobile unit (e.g., a mobile phone) about random access resources and configuration settings. Essentially, the RACH parameters inform a mobile phone of how to connect the network.

A mobile phone attempting to connect to such a network first makes a RACH transmission. The RACH transmission typically includes two parts: a preamble transmission and a message transmission. The preamble transmission is timed to fit one of a plurality of access slots and uses one of a plurality (e.g., 16) of access signatures. In a typical example, the preamble transmission may only be 4096 chips long (approximately 1 ms) with a spreading factor (SF) of 256. The message transmission is then sent. The message transmission is used for uplink signaling or transfer of uplink short packets. The message transmission is generally longer than the preamble transmission (approximately 10-20 ms) and has a variable SF (32-256). By detecting and storing RACH parameters for available networks, access probe and energy detection unit 220 may be better able to scan for and detect a corresponding RACH transmission coming from a communication device near the cab. Operation of the access probe and energy detection unit 220 will be discussed in more detail below.

In one example of the disclosure, the system parameters of the detected available radio communication services are stored in a memory, e.g., in a lookup table. Communication service detection unit 210 may be configured to update the lookup table periodically or continuously. That is, the system parameters stored in the lookup table may be limited to only the parameters for communication services that are currently detectable by communication service detection unit 210. In this way, access probe and energy detection unit 220 need not attempt to detect uplink transmissions (e.g., a RACH transmission) for any communication services that are not currently available. In another example of the disclosure, all system parameters detected remain in the lookup table regardless of whether they are available or not. The entry for a particular set of system parameters may include an availability flag that informs other units of the system whether or not a particular communication service is currently available.

Access probe and energy detection unit 220 utilizes the system parameters and/or indication of available communication services detected by communication service detection unit 210 to detect a radio signal within a proximity to the detection and classification apparatus 200 and to store the detected radio signal. That is, access probe and energy detection unit is configured to monitor uplink channels for communication services indicated as available communication service detection unit.

In the example of attempting to detect an uplink to a cellular network, access probe and energy detection unit 220 may be configured to monitor for RACH transmissions according to the RACH parameters stored in the memory for available communication services. Other system parameters for the available communication services may also be used to detect uplink transmissions, including frequency band, frequency channel, and type of air interface technologies. In particular, access probe and energy detection unit 220 may be configured to detect radio signal energy levels in available frequency bands. Once energy is detected, access probe and energy detection unit 220 monitors for RACH preamble transmissions or types access probe signals that typically occur right before uplink transmission is established on a cellular network. In one example, detection of an access probe and/or RACH transmission may cause access probe and energy detection unit 220 to begin receiving and storing subsequent radio signals broadcast over the frequency channel and air interface technology related to the detected access probe. Storage of the subsequent radio signals, including any access probes and/or RACH transmissions, may be accomplished through the use of a high speed sampler and connected memory. In one example of the disclosure, access probe and energy detection unit 220 is not configured to decrypt the actual content of any uplink transmissions, but rather, simply stores the detected and received signal without attempting to discern the actual content. A more detailed description of an example system for communication service detection unit 210 and access probe and energy detection unit 220 will be discussed below with reference to FIG. 4.

In another example of the disclosure, detection and classification apparatus 200 may be operable for use without communication service detection unit 210. In this example, access probe and energy detection unit 220 may be configured to monitor for radio signals transmitted over one or more predetermined communication services without knowledge of what communication services are currently available. In this example, keeping and updating a lookup table of system parameters for available communication services may be avoided. However, detection of transmitted energy may be slower, as access probe and energy detection unit 220 will be configured to scan over a predetermined set of radio communication services, even if some aren't available.

In some examples, access probe and energy detection unit 220 may be configured to use one of several techniques to help verify whether or not detected radio signals are coming from within the vehicle. For example, in a traffic situation, it is possible for access probe and energy detection unit 220 to detect energy from radio signals emanating from other drivers or other sources near the road. One technique for determining if the signal came from within the vehicle is a simple energy level calculation. As the driver, and presumably the device making the uplink transmission, is closest to access probe and energy detection unit 220, the energy level of such a transmission is likely to be higher than other transmissions coming from farther away. An energy level threshold may be set to determine whether or not a particular signal should be sampled and stored or not. The level of this threshold may be flexible to allow for a desired level of tradeoff between accuracy (e.g., fewer stored signals coming from outside the vehicle) and thoroughness (e.g., missing fewer signal coming from inside the vehicle.

Other techniques for determining where the origin of a detected radio signal may take the Doppler Effect in account. Stationary sources of radio transmissions, or other sources moving at a different speed than the vehicle in which access probe and energy detection unit 220 is mounted, will include frequency shift characteristics (either elongation or compression). Access probe and energy detection unit 220 may be configured to detect such features and disregard such signals. In other examples, temporal/spectral analysis unit 230 may be configured to detect such characteristics after a signal is stored by access probe and energy detection unit 220. In this example, temporal/spectral analysis unit 230 may be configured to discard any stored radio signals determined to not have been emanated from within the vehicle based on Doppler Effect characteristics.

In another example, access probe and energy detection unit 220 may be configured to utilize and update a learning approach to aid in the detection of radio signals. In this context, a learning approach may involve the use and update of prior information concerning positive classification of detected radio signals. For example, the system parameters that are most often associated with a positive detection and classification of radio signal emanating from within the vehicle may be used to monitor certain frequency bands and air interface technologies more frequently than other detected available communication services. In other words, access probe and energy detection unit 220 will more frequently monitor the communication service that has been detected and classified in the past.

Another technique for aiding in determining whether or not a radio signal came from within the vehicle involves the analysis of a multipath signature. A multipath signature includes temporal and/or frequency response characteristics that are present on a signal due to multipath interference. Multipath interference occurs because a radio signal may bounce off, or be affected by physical structures between the transmitter (e.g., a mobile phone) and a receiver (e.g., a base station or access probe and energy detection unit 220). For example, a radio signal emanating from a mobile phone used by the driver of a truck may bounce off of many physical features of the truck cab (steering wheel, seat, ceiling, etc.) before reaching antenna 250. A particular multipath signature will be created for such a radio signal. Because radio signals will often emanate from approximately the same place in a given vehicle (e.g., the driver's seat) the multipath signature may be useful in correctly verifying whether or not a particular radio signal emanated from within the vehicle. As such, multipath signatures for positively verified uplink transmissions coming from within the vehicle (or near a predetermined proximity to detection and classification unit 200) may be stored and used as part of the detection and/or classification process. Such multipath signatures may be continuously updated as more positive verifications occur. In still other examples, a wide variety of filtering or other techniques may be used to help determine the origin of a detected radio signal.

Temporal/spectral analysis unit 230 is configured to analyze the radio signal detected and stored by access probe and energy detection unit 220. The analysis output by temporal/spectral analysis module 230 may then be used by signal classification unit to classify a type of activity of the radio signal (e.g., voice call, text message, internet browsing activity, etc.). Temporal/spectral analysis unit 230 may be configured to perform one or more of temporal analysis and spectral analysis.

A temporal analysis of the stored signal will reveal signal characteristics such as length of transmission in time, and the amplitude or energy of the transmission. Different types of transmission activity may display different temporal characteristics, as will be explained in more detail with reference to FIGS. 5-7 below. In general, a voice call may include one or more access probes followed by a relatively long transmission at varying energy levels, a text message may include one or more access probes followed by a short, uniform energy level transmission, and internet browsing activity may include one or more series of short to medium length, relatively constant level energy transmissions, often at asynchronous intervals (e.g., downloading and reading web pages).

Temporal/spectral analysis unit 230 may also be configured to perform a spectral analysis of the received signal. A spectral analysis shows the frequency response of the signal over a certain time period. Different types of radio transmission activity may be characterized by different frequency responses.

For example, spectral analysis may be used to determine and/or verify the primary air interface technology used by a communication device. For example, a communication device conforming to UMTS will transmit a radio signal that will look like a continuous spectrum over all the frequency channels when analyzed in the frequency domain. On the other hand, a communication device conforming to LTE will transmit a radio signal that will appear as a disjoint set of tones or resource block when analyzed in the frequency domain. Furthermore, in the case of an LTE signal, the number of resource blocks that were assigned, as shown in a spectral analysis of an LTE transmission, may be used to confirm the type of services (e.g., voice call, text message, etc.).

As another example, spectral analysis may be used to confirm the frequency band and/or channel number a particular communication device is transmitting over. Such a confirmation may be useful in prioritizing the frequency bands and/or channel numbers access probe and energy detection unit 220 should monitor first and more often.

Temporal/spectral analysis unit 230 may comprise dedicated hardware (e.g., a digital signal processor) configured to perform the analysis. In another example, temporal/spectral analysis unit 230 may be implemented as instructions executing on a general purpose processor.

Signal classification unit 240 is configured to classify a type of activity of the stored radio signal based on the analysis by temporal/spectral analysis unit 230. Possible types of activity may include one or more of a text message, a voice call, a user-initiated internet access, and a background communication. Example techniques for classification will be discussed in more detail below with reference to FIGS. 5-7. Once a recorded signal is classified, signal classification unit 240 may store a record indicating a time of the classified type of activity. Such records may constitute a log of all activity detected and classified by detection and classification unit 200. In one example, any classification of activity may be immediately broadcasted (e.g., over a wireless channel) to a third party (e.g., the owner of the vehicle). In this way, potentially dangerous driver activity may be promptly reported. In other example, the log of activity may be obtained from detection and classification unit 200 through a direct request (e.g., wirelessly or through direct download).

Signal classification unit 240 may comprise dedicated hardware (e.g., a digital signal processor) configured to perform the classification. In another example, signal classification unit 240 may be implemented as instructions executing on a general purpose processor.

Figure 3:
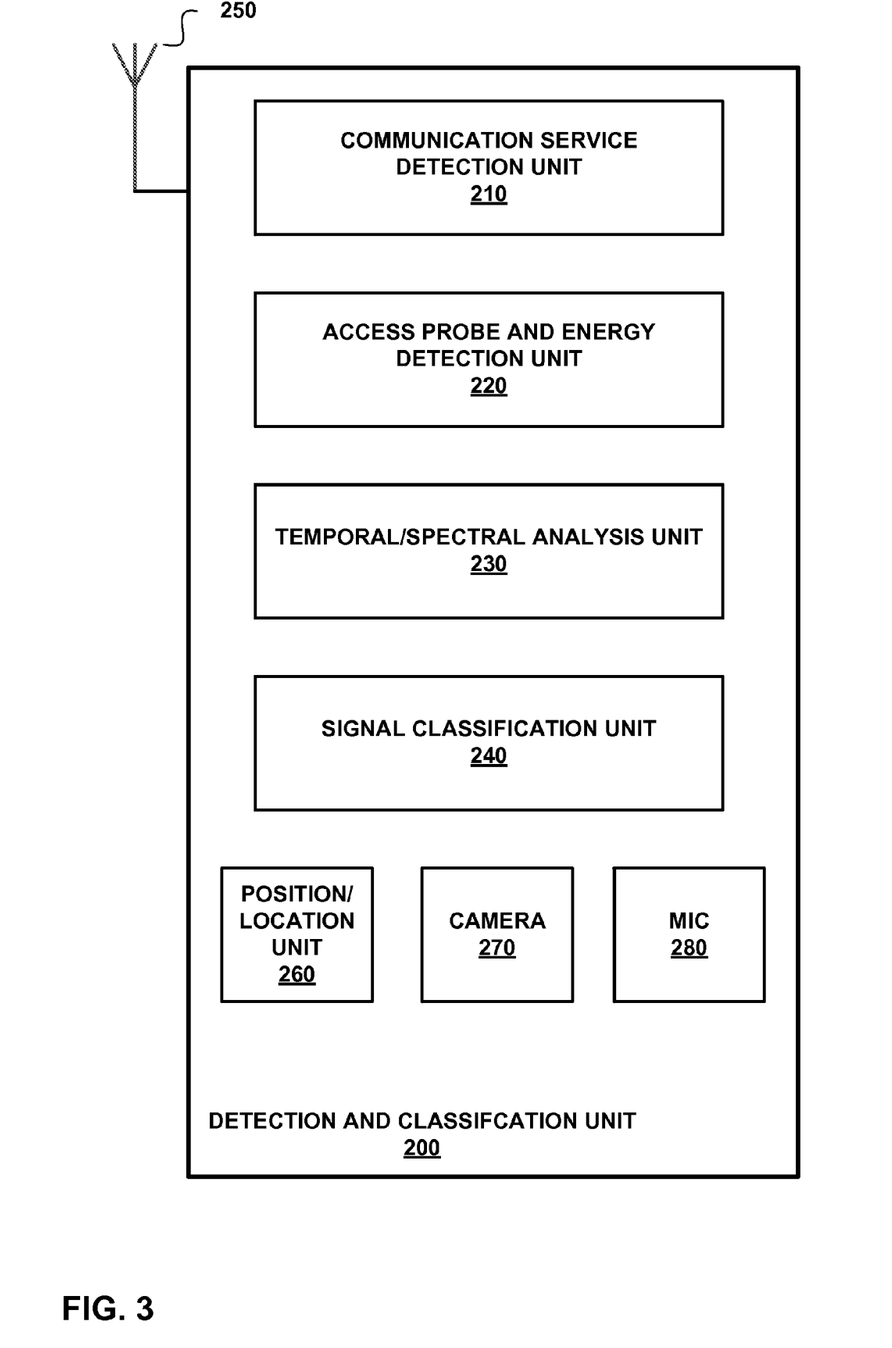
FIG. 3 is a block diagram illustrating another example detection and classification unit according to one example of the disclosure.

FIG. 3 is a block diagram illustrating another example detection and classification unit according to one example of the disclosure. In the example of FIG. 3, additional structures may be used to aid in the detection and classification of radio signals. In the example of FIG. 3, detection and classification unit 200 may further include position/location unit 260, camera 270, and microphone 280.

Position/location unit 260 may be any device and/or instructions that provide detection and classification unit 200 that ability to discern its location. In one example, position/ location unit 260 is a global positioning system (GPS) receiver. The location and time data produced by position/location unit 260 may be included when a signal is recorded and then stored in the log for a classified signal. This will let a viewer of the log know the time and location of a particular activity.

In some examples, position/location unit 260 may also be used to activate access probe and energy detection unit 220. In the example of use in a vehicle, it may be desirable to only detect and classify radio signals in the situation where the vehicle is moving, as this is the situation where driver distraction can be dangerous. Since position/location unit 260 is able to detect changes in position, it is also able to detect movement. Access probe and energy detection unit 220 may then be configured to be activated when a speed measurement of position/location unit rises above some predetermined threshold (e.g., 15 mph).

Camera 270 may be configured to record still pictures and/or video. Such pictures and video may be useful in confirming the correct classification of a classified radio signal. For example, pictures and/or video files may be stored in conjunction with the stored radio signal and/or log of classified activity. A third party (e.g., owner of the vehicle) may then study such pictures and video files to verify whether or not the driver was actually using a device when a radio signal was detected and/or classified. Furthermore, pictures and/or video files may be directly used by signal classification unit 240 to aid in classification. For example, signal classification unit 240 may be configured to perform image recognition and object tracking (e.g., recognize when a person is holding a phone to the ear) on a picture or video related to a particular stored video signal. The result of such an image recognition and object tracking process may be used in addition to the temporal and/or spectral analysis to make a classification of activity or determine if no activity had taken place. In some examples, camera 270 may be activated to begin taking pictures or recording video by a detection of energy by access probe and energy detection unit 220.

Microphone 280 may be configured to record sound, either independently or in conjunction with recording by camera 270. Recorded sound may also be useful in confirming that a classified radio signal was correct. For example, sound files may be stored in conjunction with the stored radio signal and/or log of classified activity. A third party (e.g., owner of the vehicle) may then study such sound files to verify whether or not the driver was actually using a device when a radio signal was detected and/or classified (e.g., a voice call). Furthermore, sound files may be directly used by signal classification unit 240 to aid in classification. For example, signal classification unit 240 may be configured to verify a classification of a voice call by also determining if audio was recorded by microphone 280 at the time of the suspected phone call. As such, the sound file may be used in addition to and conjunction with the temporal and/or spectral analysis to make a classification of activity or determine if no activity had taken place. In some examples, microphone 280 may be activated to begin recording sound by a detection of energy by access probe and energy detection unit 220.

Figure 4:
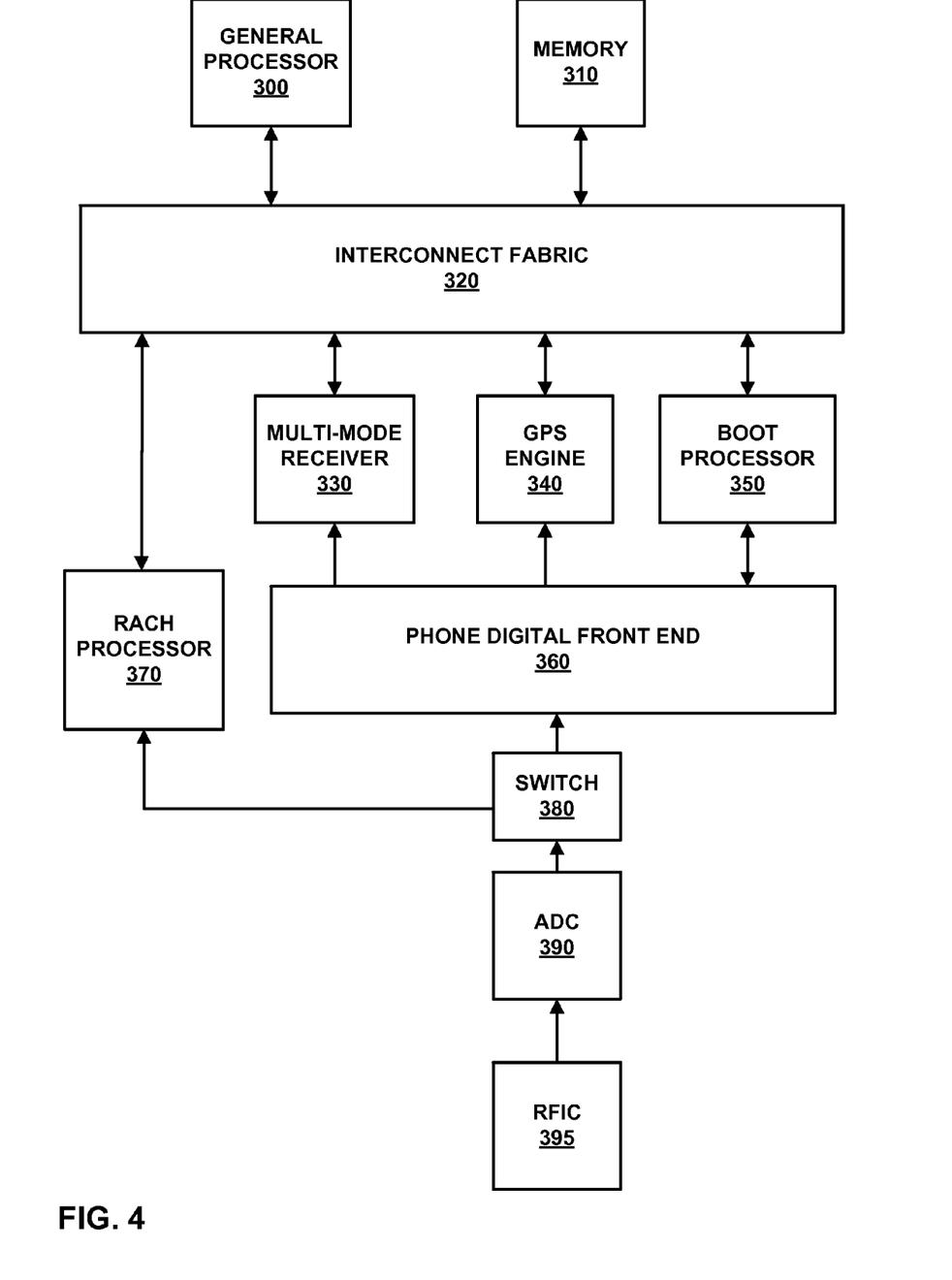
FIG. 4 is a block diagram illustrating an example communication service detection unit and access probe and energy detection unit according to one example of the disclosure.

FIG. 4 is a block diagram illustrating an example communication service detection unit and access probe and energy detection unit according to one example of the disclosure. As discussed above, communication service detection unit 210 may be implemented with multi-mode receiver 330, such as those commonly found in current multi-mode mobile phones. RACH parameters and other system information may be received by multi-mode receiver 330 through a receiver front end. The receiver front end may include a radio frequency integrated circuit (RFIC) 395 configured to down convert a radio signal received at an antenna (e.g., antenna 250). The down converted analog signal is then converted to a digital signal by analog-to-digital converter (ADC) 390). Switch 380 may then route the digital signal to phone digital front end 360 (e.g., for use by multi-mode receiver 330 in performing communication service detection and storage of system parameters) or routed to RACH processor 370 (e.g., for use by access probe and energy detection 210).

Phone digital front end 360 routes the demodulated signal to either multi-mode receiver 330 (e.g., for received voice, text, and/or internet data) or to GPS engine 340 (e.g., for received position/location signals). Operation modes of phone digital front end 360, GPS engine 340 and multi-mode receiver 330 may be configured by boot processor 350.

Multi-mode receiver 330 receives the digital signal (which may comprise parameters from available communication services) from phone digital front end 360. The system parameters, such as RACH parameters, SIBs, frequency band, frequency channel, air interface technology, or other parameters, are then passed through interconnect fabric 320 to general processor 300 (for later storage in memory 310) or are stored directly in memory 310. Memory 310 may be any type of memory capable of storing data, including include one or more volatile or non-volatile memories or storage devices, such as, for example, random access memory (RAM), static RAM (SRAM), dynamic RAM (DRAM), synchronous dynamic random access memory (SDRAM), read-only memory (ROM), erasable programmable ROM (EPROM), electrically erasable programmable ROM (EEPROM), Flash memory, a magnetic data media or an optical storage media.

Signals routed to RACH processor 370 are processed as part of the access probe and energy detection process. That is RACH processor receives signals through the RF front end (antenna 250, RFIC 395, ADC 390) and determines if any RACH transmissions or access probes have been received. If so, RACH processor 370 may be configured to sample and store subsequently received radio signals in memory 310.

Figure 5:
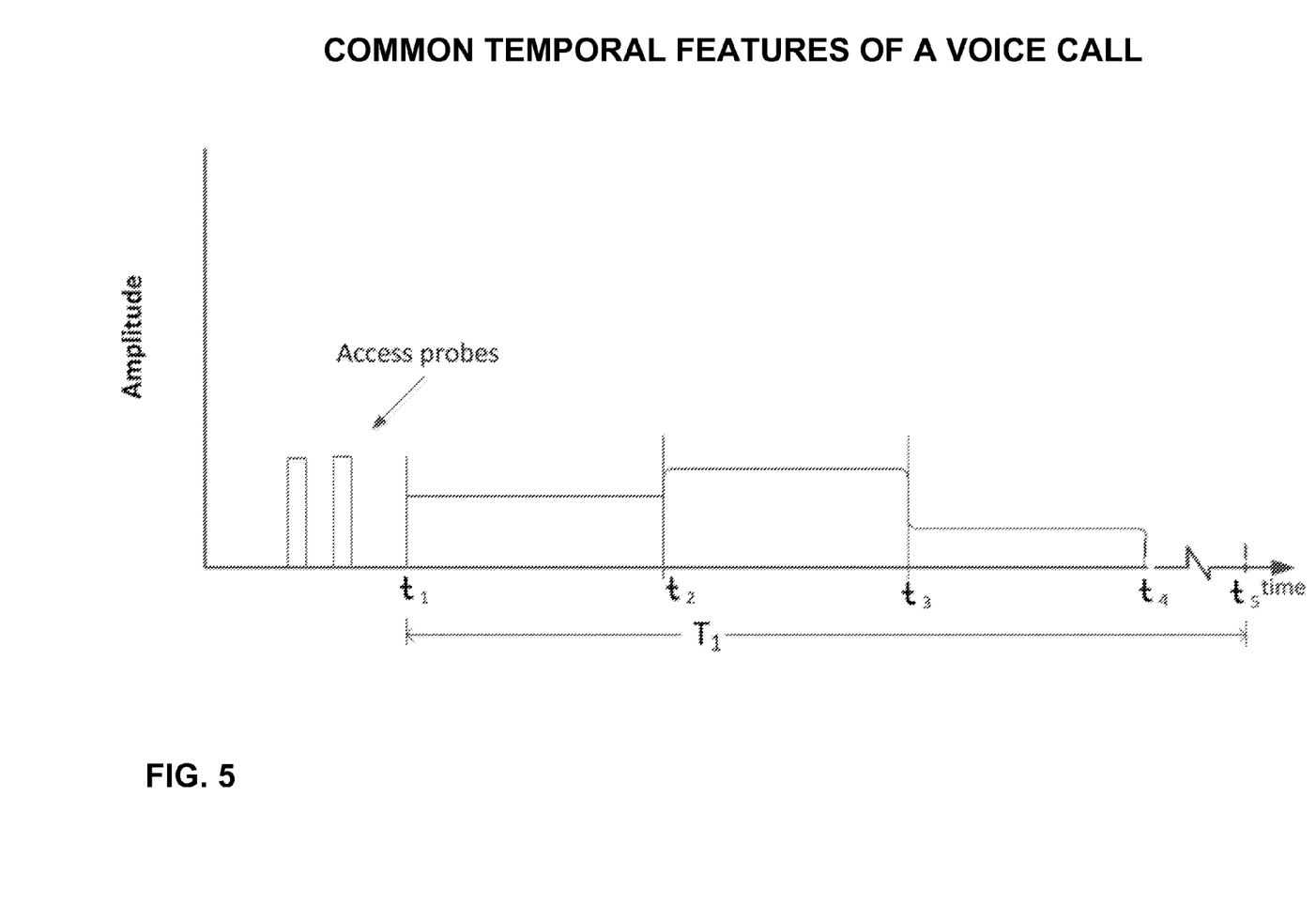
FIG. 5 is a conceptual diagram illustrating example temporal features of a voice call.

FIG. 5 is a conceptual diagram illustrating example temporal features of a voice call. The temporal features shown in FIG. 5 may be considered an example of output of temporal analysis, which may be performed by temporal/spectral analysis unit 230. A relative amplitude of the energy level of a detected radio signal and the length in time of the detected radio signal is shown in FIG. 5. As also shown in FIG. 5, a typical voice call may be begin with one or more short, and relatively high amplitude access probes. Access probes are generally very short burst of energy, lasting 10-20 ms. Following the access probes are typically one or more relatively long periods T1 (anywhere from a few seconds to many minutes) that include a varying amplitude signal. Varying amplitude of a signal is a typical feature of voice calls due to power control processing typical in most modern mobile phones. Signal classification unit 240 may be configured to detect such characteristics in a temporal analysis to make the determination that a particular signal is a voice call.

Figure 6:
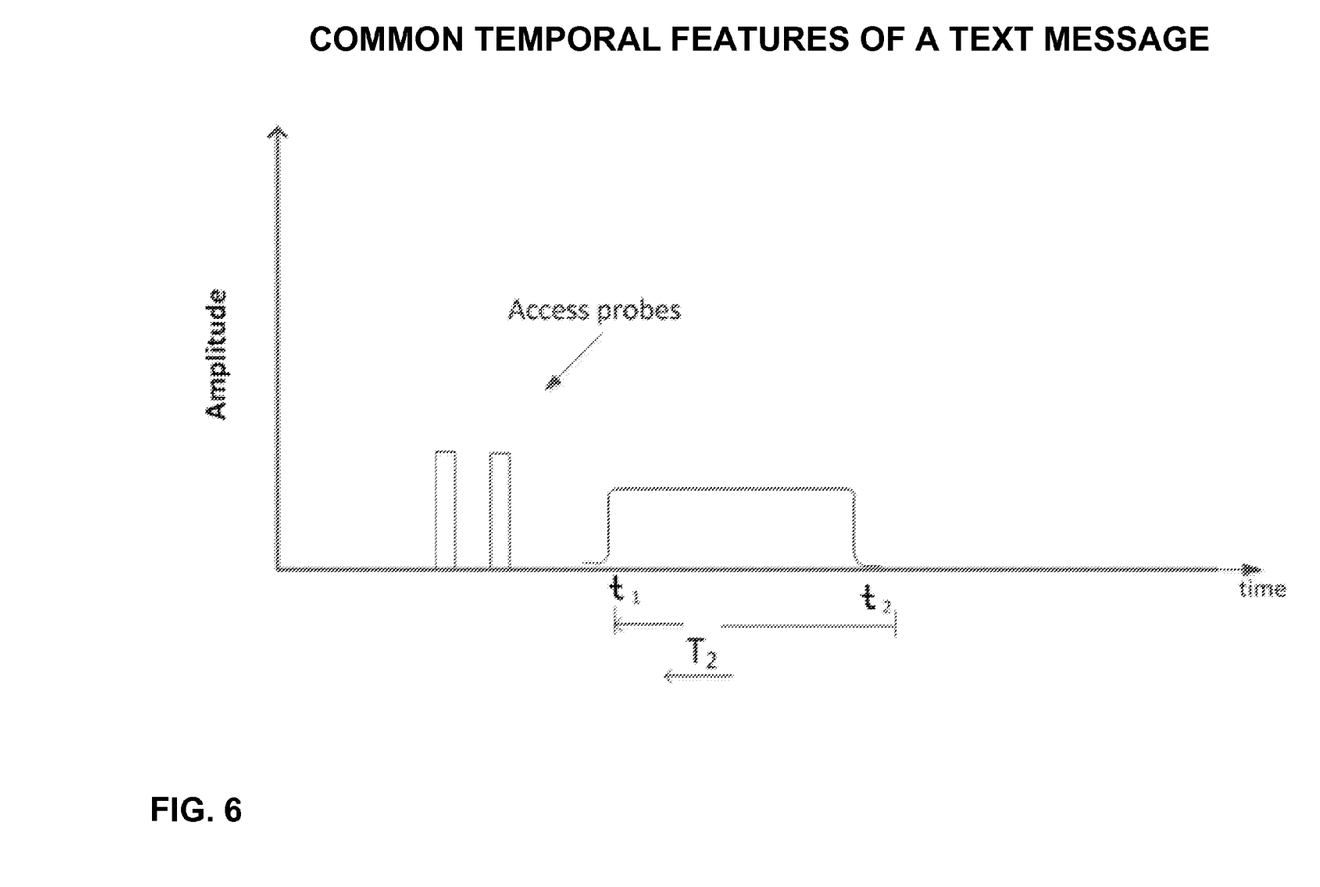
FIG. 6 is a conceptual diagram illustrating example temporal features of a text message.

FIG. 6 is a conceptual diagram illustrating example temporal features of a text message. The temporal features shown in FIG. 6 may be considered an example of output of temporal analysis, which may be performed by temporal/spectral analysis unit 230. A relative amplitude of the energy level of a detected radio signal and the length in time of the detected radio signal is shown in FIG. 6. As also shown in FIG. 6, a typical text message may be begin with one or more short, and relatively high amplitude access probes. Following the access probes are typically one or more longer periods T2 (on the order of milliseconds) of a relatively stable amplitude radio signal. Such signal characteristics are typical of a short message service (SMS) text message. Note that the temporal characteristics of an SMS text message differ from a voice call in several ways. For one, the length of the radio signal after the access probes is much shorter, and is typically too short to have constituted a voice conversation. Furthermore, due to the short nature of a text message, the radio signal has a much more constant amplitude due for the reduced need for power control processing. Signal classification unit 240 may be configured to detect such characteristics in a temporal analysis to make the determination that a particular signal is a text message.

Figure 7:
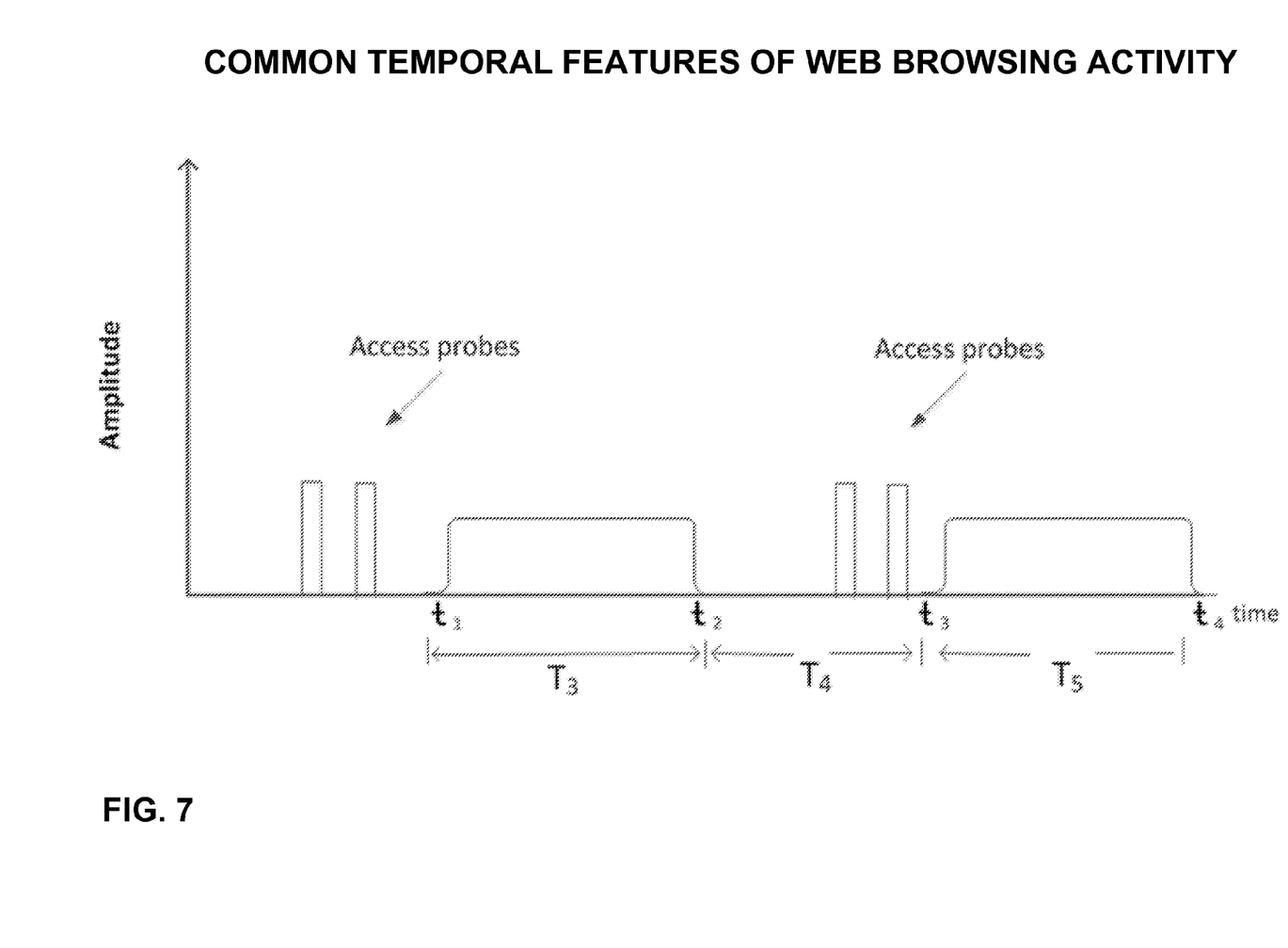
FIG. 7 is a conceptual diagram illustrating example temporal features of internet browsing activity.

FIG. 7 is a conceptual diagram illustrating example temporal features of internet browsing activity. Again, the temporal features shown in FIG. 7 may be considered as an example output of temporal analysis performed by temporal/spectral analysis unit 230, in that a relative amplitude of the energy level of a detected radio signal and its length in time is shown. As shown in FIG. 7, typical internet browsing activity may be begin with one or more short, relatively high amplitude access probes. Following the access probes is a longer period T3 (on the order of milliseconds to second) of a relatively stable amplitude radio signal. Such signal characteristics may be typical of a internet activity, such as downloading a web page. Additional sequences similar to the signal pattern in time T3 may or may not follow. In the example of FIG. 7, an additional sequence T5 follows T3 with a length of non-activity T4 (e.g., the period of time when the user was reading a web page). In particular, internet browsing activity may be characterized by such sequences of asynchronous activity and non-activity.

Because of this, in some instances it may be preferable to analyze several instances of recorded signals together to better verify whether or not activity is internet browsing or non user-initiated background communications (e.g., communications executed by a device without input or activity by the user). Background communications may be characterized by uplink transmissions at regular time intervals, while user-initiated internet browsing may be more asynchronous.

Also, while similar to the temporal characteristics of text messages, the temporal characteristics of browsing activity generally exhibit slightly longer uplink transmissions. Signal classification unit 240 may be configured to detect the characteristics described above in a temporal analysis to make the determination that a particular signal (or signals) is internet browsing activity.

Figure 8:
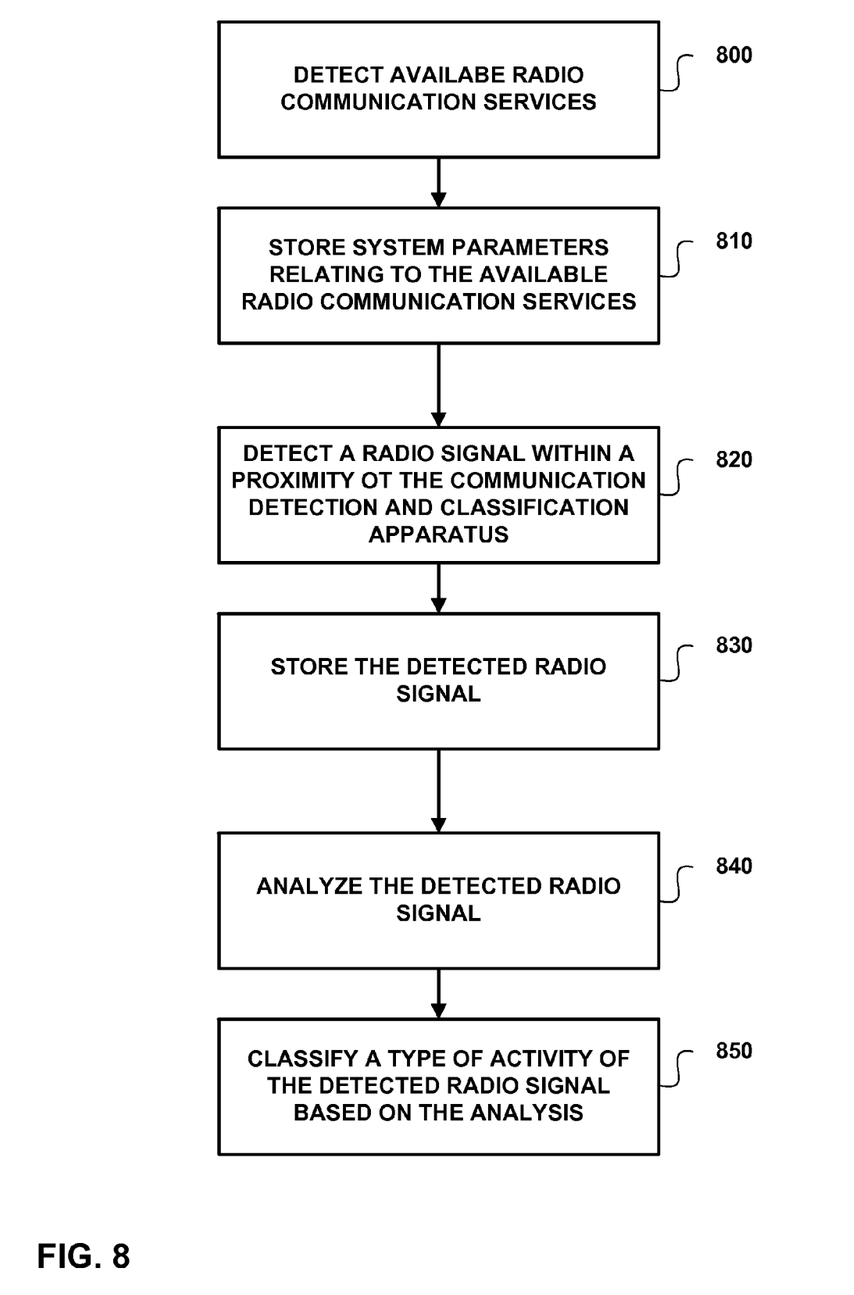
FIG. 8 is a flow chart illustrating a method according to examples of the disclosure.

FIG. 8 is a flow chart illustrating n method according to one example of the disclosure. In one example, the method of FIG. 8 may be executed by detection and classification unit 200 of FIG. 2 or FIG. 3. In one or more examples of FIG. 8, communication detection and classification apparatus 200 is located on or within a vehicle (e.g., truck 100 of FIG. 1).

In the method of FIG. 8, communication service detection unit 210 may be configured to detect available radio communication services (800) and to store system parameters relating to the available radio communication services in a memory (810). In one example of the disclosure, the system parameters relating to the available radio communication services comprise one or more of a frequency band, frequency channel, an air interface protocol, and random access channel parameters.

In one example of the disclosure, communication service detection unit 210 may be configured to periodically detect available radio communication services and to update the system parameters stored in the memory. In another example of the disclosure, communication service detection unit 210 may be configured to continually detect available radio communication services and to update the system parameters stored in the memory.

Access probe and energy detection unit 220 may be configured to detect a radio signal within a proximity to the communication detection and classification apparatus 200 (820). The detected radio signal may be communicated over one of the detected available radio communication services. In one example of the disclosure, access probe and energy detection unit 220 is configured to detect the radio signal using the system parameters relating to the available radio communication services stored in the memory. Access probe and energy detection unit 220 may be further configured to store the detected radio signal (830). In some examples of the disclosure, access probe and energy detection unit is activated based on a controlled trigger. For example, the controller trigger may be an indication that a vehicle in which communication detection and classification apparatus 200 is mounted is moving (e.g., as indicated by a position/location device).

Temporal/spectral analysis unit 230 is configured to analyze the detected radio signal (840). Temporal/spectral analysis unit 230 may be configured to perform one or more of temporal analysis and spectral analysis. Signal classification unit 240 is configured to classify a type of activity of the detected radio signal based on an output of temporal/spectral analysis unit 230 (850). The type of activity may include one or more of a text message, a voice call, a user-initiated internet access, and a background communication. In an example of the disclosure, signal classification unit 240 may be further configured to store a record indicating a time of the classified type of activity.

In other examples of the disclosure, communication detection and classification apparatus 200 may further include one or more of a camera configured to record one or more of a picture and a video, a microphone configured to record sound. In this example, signal classification unit 240 is further configured to classify the type of activity of the detected radio signal based on the output of the analysis unit, and one or more of the recorded picture, video and sound. In one example, the camera is activated in response to access probe and energy detection unit 220 detecting radio signals. In another example, the microphone is activated in response to access probe and energy detection unit 220 detecting radio signals.

In another example of the disclosure, communication detection and classification apparatus 200 may further include a position/location unit configured to determine the position of the communication detection and classification apparatus. In this example, access probe and energy detection unit 220 is operable in the case that the position/location unit indicates that communication detection and classification apparatus 200 is moving (thus indicating that the vehicle is moving).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A system configured to detect and classify radio signals, the system comprising:
   a communication detection and classification apparatus configured to detect and classify radio signals, the communication detection and classification apparatus comprising:
      a communication service detection unit configured to detect system parameters for radio communication services that are currently available and to store the detected system parameters relating to the radio communication services that are currently available in a memory;
      an energy detection unit configured to detect a radio signal from a radio communication device within a proximity to the communication detection and classification apparatus using the detected system parameters relating to the radio communication services that are currently available stored in the memory, and configured to store the detected radio signal;
      an analysis unit configured to analyze the detected radio signal by performing one or more of temporal analysis or spectral analysis on the detected radio signal; and
      a classification unit configured to classify an activity represented by the detected radio signal into one or more classes directly based on the temporal analysis or spectral analysis of the analysis unit, wherein the one or more classes of the activity include one or more of a text message, a voice call, a user-initiated Internet access, or a background communication.

2. The system of claim 1, wherein the communication service detection unit includes a multi-mode transceiver configured to communicate over a plurality of the radio communication services, and wherein the detected system parameters relating to the radio communication services that are currently available comprise one or more of a frequency band, frequency channel, an air interface protocol, and random access channel parameters.

3. The system of claim 2, wherein the multi-mode transceiver is configured to periodically detect the system parameters for radio communication services that are currently available and to update the detected system parameters stored in the memory.

4. The system of claim 2, wherein the multi-mode transceiver is configured to continually detect the system parameters for radio communication services that are currently available and to update the detected system parameters stored in the memory.

5. The system of claim 2, wherein the energy detection unit is activated based on a controlled trigger.

6. The system of claim 1, wherein the classification unit is further configured to store a record indicating a time of the classified activity.

7. The system of claim 1, further comprising at least one of:
   a camera configured to record one or more of a picture and a video; and
   a microphone configured to record sound,
   wherein the classification unit is further configured to classify the activity represented by the detected radio signal into one or more classes based on the output of the analysis unit, and one or more of the recorded picture, video or sound.

8. The system of claim 7, wherein the communication detection and classification apparatus is configured to activate the camera in response to the energy detection unit detecting the radio signal.

9. The system of claim 7, wherein the communication detection and classification apparatus is configured to activate the microphone in response to the energy detection unit detecting the radio signal.

10. The system of claim 1, further comprising:
    a position/location unit configured to determine the position of the communication detection and classification apparatus.

11. The system of claim 10, wherein the energy detection unit is operable in the case that the position/location unit indicates that the communication detection and classification apparatus is moving.

12. The system of claim 1, further comprising:
    a vehicle, wherein the communication detection and classification apparatus is located on or within a vehicle.

13. A method of detecting and classifying radio signals using a communication detection and classification apparatus, the method comprising:
    detecting system parameters for radio communication services that are currently available;

storing the detected system parameters relating to the radio communication services that are currently available in a memory;

detecting a radio signal from a radio communication device within a proximity to the communication detection and classification apparatus using the detected system parameters relating to the radio communication services that are currently available stored in the memory;

storing the detected radio signal;

analyzing the detected radio signal by performing one or more of temporal analysis or spectral analysis on the detected radio signal; and classifying an activity represented by the detected radio signal into one or more classes directly based on the one or more of the temporal analysis or spectral analysis, wherein the one or more classes of the activity include one or more of a text message, a voice call, a user-initiated internet access, or a background communication.

14. The method of claim 13, wherein detecting radio communication services that are currently available comprises detecting radio communication services that are currently available over a plurality of the radio communication services, and
wherein the detected system parameters relating to the radio communication services that are currently available comprise one or more of a frequency band, frequency channel, an air interface protocol, and random access channel parameters.

15. The method of claim 14, further comprising:
periodically detecting the system parameters for radio communication services that are currently available; and
updating the detected system parameters stored in the memory.

16. The method of claim 14, further comprising:
continually detecting the system parameters for radio communication services that are currently available; and
updating the detected system parameters stored in the memory.

17. The method of claim 14, wherein detecting the radio signal from the radio communication device within the proximity to the communication detection and classification apparatus is activated based on a controlled trigger.

18. The method of claim 13, further comprising:
storing a record indicating a time of the classified activity.

19. The method of claim 13, further comprising:
classifying the activity represented by the detected radio signal into one or more classes based on the analysis, and one or more of a recorded picture, video or sound.

20. The method of claim 19, further comprising:
activating a camera in response to detecting the radio signal.

21. The method of claim 19, further comprising:
activating a microphone in response to detecting the radio signal.

22. The method of claim 13, further comprising:
determining a position of the communication detection and classification apparatus.

23. The method of claim 22, further comprising:
determining that the communication detection and classification apparatus is moving,
wherein detecting a radio signal from the radio communication device within a proximity to the communication detection and classification apparatus comprises detecting a radio signal from the radio communication device within a proximity to the communication detection and classification apparatus in the case that the communication detection and classification apparatus is determined to be moving.

24. The method of claim 13, wherein the communication detection and classification apparatus is located on or within a vehicle.

25. A system configured to detect and classify radio signals, the system comprising:
means for detecting system parameters for radio communication services that are currently available;
means for storing the detected system parameters relating to the radio communication services that are currently available in a memory;
means for detecting a radio signal from a radio communication device within a proximity to the communication detection and classification apparatus using the detected system parameters relating to the radio communication services that are currently available stored in the memory;
means for storing the detected radio signal;
means for analyzing the detected radio signal by performing one or more of temporal analysis or spectral analysis on the detected radio signal; and
means for classifying an activity represented by the detected radio signal into one or more classes directly based on the one or more of the temporal analysis or spectral analysis, wherein the one or more classes of the activity include one or more of a text message, a voice call, a user-initiated internet access, or a background communication.

26. A non-transitory computer-readable storage medium storing instructions that, when executed by one or more processors, cause the one or more processors of a system configured to detect and classify radio signals to:
detect system parameters for radio communication services that are currently available;
store the detected system parameters relating to the radio communication services that are currently available in a memory;
detect a radio signal from a radio communication device within a proximity to the communication detection and classification apparatus using the detected system parameters relating to the radio communication services that are currently available stored in the memory;
store the detected radio signal;
analyze the detected radio signal by performing one or more of temporal analysis or spectral analysis on the detected radio signal; and
classify an activity represented by the detected radio signal into one or more classes directly based on the one or more of the temporal analysis or spectral analysis, wherein the one or more classes of the activity include one or more of a text message, a voice call, a user-initiated internet access, or a background communication.

27. A communication detection and classification apparatus configured to detect and classify radio signals, the communication detection and classification apparatus comprising:
a communication service detection unit configured to detect system parameters for radio communication services that are currently available and to store the detected system parameters relating to the radio communication services that are currently available in a memory;
an energy detection unit configured to detect a radio signal from a radio communication device within a proximity to the communication detection and classification apparatus using the detected system parameters relating to the radio communication services that are currently available stored in the memory, and configured to store the detected radio signal;

an analysis unit configured to analyze the detected radio signal by performing one or more of temporal analysis or spectral analysis on the detected radio signal; and a classification unit configured to classify an activity represented by the detected radio signal into one or more classes directly based on the temporal analysis or spectral analysis of the analysis unit, wherein the one or more classes of the activity include one or more of a text message, a voice call, a user-initiated internet access, or a background communication.

28. The communication detection and classification apparatus of claim 27, wherein the communication service detection unit includes a multi-mode transceiver configured to communicate over a plurality of the radio communication services, and wherein the detected system parameters relating to the radio communication services that are currently available comprise one or more of a frequency band, frequency channel, an air interface protocol, and random access channel parameters.

29. The communication detection and classification apparatus of claim 28, wherein the multi-mode transceiver is configured to periodically detect the system parameters for radio communication services that are currently available and to update the detected system parameters stored in the memory.

30. The communication detection and classification apparatus of claim 28, wherein the multi-mode transceiver is configured to continually detect the system parameters for radio communication services that are currently available and to update the detected system parameters stored in the memory.

31. The communication detection and classification apparatus of claim 28, wherein the communication detection and classification apparatus is configured to activate the energy detection unit based on a controlled trigger.

32. The communication detection and classification apparatus of claim 27, wherein the classification unit is further configured to store a record indicating a time of the classified activity.

33. The communication detection and classification apparatus of claim 27, further comprising at least one of:
 a camera configured to record one or more of a picture and a video; and
 a microphone configured to record sound,
  wherein the classification unit is further configured to classify the activity represented by the detected radio signal into one or more classes based on the output of the analysis unit, and one or more of the recorded picture, video or sound.

34. The communication detection and classification apparatus of claim 33, wherein the communication detection and classification apparatus is configured to activate the camera in response to the energy detection unit detecting the radio signal.

35. The communication detection and classification apparatus of claim 33, wherein the communication detection and classification apparatus is configured to activate the microphone in response to the energy detection unit detecting the radio signal.

36. The communication detection and classification apparatus of claim 27, further comprising:
 a position/location unit configured to determine the position of the communication detection and classification apparatus.

37. The communication detection and classification apparatus of claim 36, wherein the energy detection unit is operable in the case that the position/location unit indicates that the communication detection and classification apparatus is moving.

* * * * *